(12) United States Patent
Kim et al.

(10) Patent No.: US 9,445,959 B2
(45) Date of Patent: Sep. 20, 2016

(54) TWO-WHEELED SELF-BALANCING WHEELCHAIR

(71) Applicants: Joon-Hyung Kim, Seoul (KR); Tae-Ho Kang, Seoul (KR)

(72) Inventors: Joon-Hyung Kim, Seoul (KR); Tae-Ho Kang, Seoul (KR)

( * ) Notice: Subject to any disclaimer, the term of this patent is extended or adjusted under 35 U.S.C. 154(b) by 29 days.

(21) Appl. No.: 14/559,068

(22) Filed: Dec. 3, 2014

(65) Prior Publication Data

US 2016/0158078 A1  Jun. 9, 2016

(51) Int. Cl.
*A61G 5/04* (2013.01)
*B62K 3/00* (2006.01)
*A61G 5/10* (2006.01)

(52) U.S. Cl.
CPC ............. *A61G 5/041* (2013.01); *A61G 5/1029* (2013.01); *B62K 3/00* (2013.01); *A61G 5/1075* (2013.01); *A61G 2005/1086* (2013.01); *A61G 2005/1089* (2013.01); *A61G 2203/42* (2013.01)

(58) Field of Classification Search
CPC ... A61G 5/04; A61G 5/10; A61G 2005/1089
See application file for complete search history.

(56) References Cited

U.S. PATENT DOCUMENTS

| | | | | |
|---|---|---|---|---|
| 8,267,213 | B2* | 9/2012 | Takenaka | B62K 1/00 180/222 |
| 8,813,893 | B2* | 8/2014 | Muto | B62K 3/007 180/10 |
| 2002/0023787 | A1* | 2/2002 | Kamen | A61G 5/04 180/7.1 |
| 2011/0204592 | A1* | 8/2011 | Johansen | A61G 3/0209 280/304.1 |
| 2011/0209932 | A1* | 9/2011 | Takenaka | B60B 19/003 180/15 |
| 2015/0060162 | A1* | 3/2015 | Goffer | B60L 11/1803 180/41 |

* cited by examiner

*Primary Examiner* — Anne Marie Boehler
*Assistant Examiner* — Marlon A Arce
(74) *Attorney, Agent, or Firm* — John K. Park; Park Law Firm

(57) ABSTRACT

A two-wheeled self-balancing wheelchair is provided, including: a housing having support brackets which are mounted directly below rotary shafts of the motors located at both sides of the bottom side of the housing, rotary shafts of the motors which are drawn out from the housing, and wheels which are mounted to the rotary shafts and rotate in a way as to read an inclination angle of a rider's body; a saddle frame which is mounted on the upper part of the housing; and multipoint supports mounted at the front and rear of the support brackets, each of the multipoint supports having a first hinge part and a second hinge part which are formed at the front ends of the multipoint support to be able to rotate by bolts and are connected with each other through a connection bar and a third hinge part.

1 Claim, 7 Drawing Sheets

(a)

(b)

(a)

(b)

TWO-WHEELED SELF-BALANCING WHEELCHAIR

BACKGROUND OF THE INVENTION

1. Field of the Invention

The present invention relates to a wheelchair. More particularly, the present invention relates to a two-wheeled self-balancing wheelchair which can run in all directions while keeping its balance on its own using two wheels mounted at the right and left of the wheelchair and which includes a multipoint support stably mounted at the lower part of the wheelchair for stopping or parking.

2. Background Art

FIGS. 1(a) and 1(b) are a perspective view and a side view of a lower moving part for explaining problems of a conventional two-wheeled self-balancing wheelchair. A two-wheeled self-balancing moving part which is the technological foundation for the present invention runs while two wheels 16 mounted at the right and left of the wheelchair keep their balance in real time. That is, in order to keep the balance of the wheels 16, a controller controls various electric processors including a gyro sensor to keep the balance of the wheels 16, such that the wheelchair can run back and forth and convert left and right directions. After a chair is mounted on the upper part of a housing 10 illustrated in FIG. 1(a), when a rider inclines his or her body at a predetermined angle forwardly or backwardly in a state where the rider sits on the chair, the various sensors including the gyro sensor read a slope and operate the wheels 16 in the direction of the slope as much as the wheelchair gets out of the slope in order to prevent the wheelchair from being turned over back and forth due to the slope, such that the wheelchair is corrected in position and can run in safety. Therefore, the wheelchair can keep its erect posture without losing its balance using the two wheels 16 mounted at the right and left of the wheelchair, move back and forth according to inclination of the rider's body, and change directions using a manipulation handle or a button located at a handle.

The conventional two-wheeled self-balancing wheelchair can keep its balance in real time in a situation that electric power is supplied, but falls down when electric power is cut off. Therefore, in order to prevent the wheelchair from being turned over, electric power must be continuously supplied to the wheelchair even during stopping or parking. In order to solve the above problem, as shown in FIG. 1, stick supports 60 are mounted at the sides of the housing 10. The stick supports 60 can move up and down by operation of an actuator as indicated by an arrow of FIG. 1(a). The stick supports 60 are lifted upwardly when the wheelchair runs and is took down to touch the ground as shown in FIG. 1(b) so that the two-wheeled self-balancing wheelchair is erected in a stable state.

However, such a two-wheeled self-balancing wheelchair has a problem in that the stick supports 60 operated by the actuator are easily bent or broken. Therefore, the wheelchair on which the old or weak sit is turned over due to the problem. For instance, when the wheelchair which is kept in a car or in a house is landed down on the ground, in a case that all loads of the wheelchair is concentrated on the stick supports 60, the stick supports 60 are bent or broken and it makes running of the wheelchair impossible. Moreover, in a case that an external shock is applied to the stick supports 60, the stick supports 60 are easily broken and it is directly connected with the rider's safety, and thus, people demand solutions of the problem of the stick supports 60.

SUMMARY OF THE INVENTION

Accordingly, the present invention has been made to solve the above-mentioned problems occurring in the prior arts, and it is an object of the present invention to provide a two-wheeled self-balancing wheelchair including multipoint supports which are mounted on the bottom side of a housing in order to let a rider drive, stop or park the wheelchair in safety, of which front ends are connected to support brackets formed on the bottom side of the housing to be able to rotate, and which has a cylinder rod mounted in the middle of the multipoint support, such that the two-wheeled self-balancing wheelchair can secure a safe running because the multipoint supports are not broken in spite of a concentrated load or an external shock applied to the wheelchair during running, stopping, parking or carrying of the wheelchair.

To accomplish the above object, according to the present invention, there is provided a two-wheeled self-balancing wheelchair including: a housing in which batteries, motors and a controller having a gyro sensor are mounted, the housing having support brackets which are mounted directly below rotary shafts of the motors located at both sides of the bottom side of the housing, rotary shafts of the motors which are drawn out from the housing, and wheels which are mounted to the rotary shafts and rotate in a way as to read an inclination angle of a rider's body; a saddle frame which is mounted on the upper part of the housing and on which a chair is mounted, the saddle frame having cylinder brackets formed at the front and rear of the saddle frame in such a way that one side of the cylinder is mounted; and multipoint supports mounted at the front and rear of the support brackets, each of the multipoint supports having a first hinge part and a second hinge part which are formed at the front ends of the multipoint support to be able to rotate by bolts and are connected with each other through a connection bar and a third hinge part which is formed in the middle of the connection bar and to which a rod of the cylinder is mounted, such that the multipoint supports are lifted while carrying out a circular motion around the first and second hinge parts mounted to the support brackets by operation of the cylinder to prevent overturn of the wheelchair.

In consideration that wheelchairs are short-distance transportation means which the old or weak mainly use, the two-wheeled self-balancing wheelchair according to the present invention can prevent an overturn accident of the wheelchair by virtue of the multipoint support so as to run, stop and park more safely. Therefore, the two-wheeled self-balancing wheelchair according to the present invention can provide convenience to the old and weak or the disabled.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

A wheelchair is a short-distance transportation means for the old, the weak or the disabled on the basis of a two-wheeled self-balancing moving part of which two wheels 16 mounted at the right and left run while keeping its balance in real time. A two-wheeled self-balancing wheelchair according to an embodiment of the present invention includes a multipoint support 50 mounted on the bottom side of the wheelchair to prevent back and forth overturn of the wheelchair due to a concentrated load or an external shock suddenly applied during running, stopping, parking or carrying of the wheelchair. Hereinafter, reference will be now made in detail to the preferred embodiments of the present invention with reference to the attached drawings.

Figure 1:
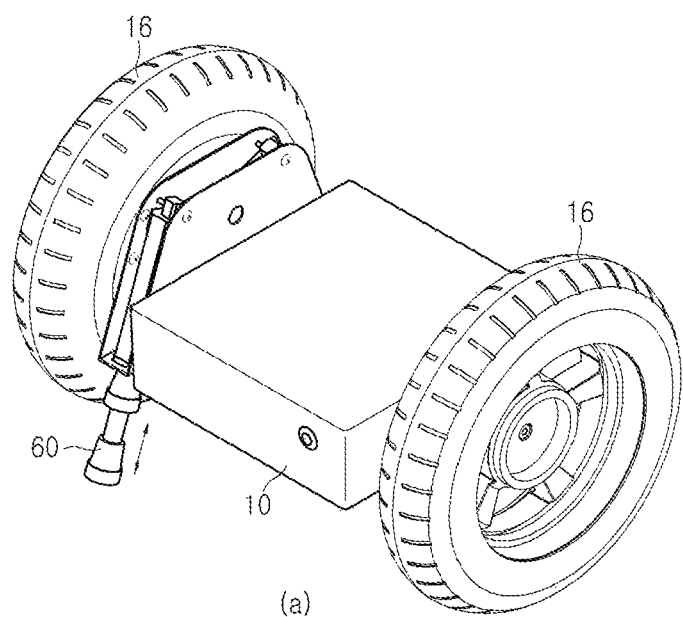
FIGS. 1(a) and 1(b) are a perspective view and a side view of a lower moving part for explaining problems of a conventional two-wheeled self-balancing wheelchair.
Figure 1:
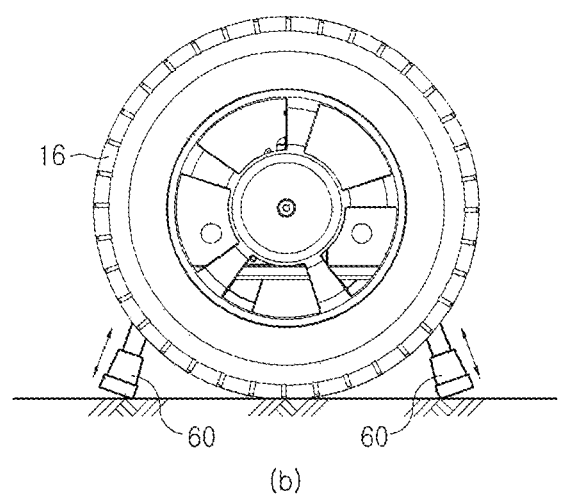
Figure 2:
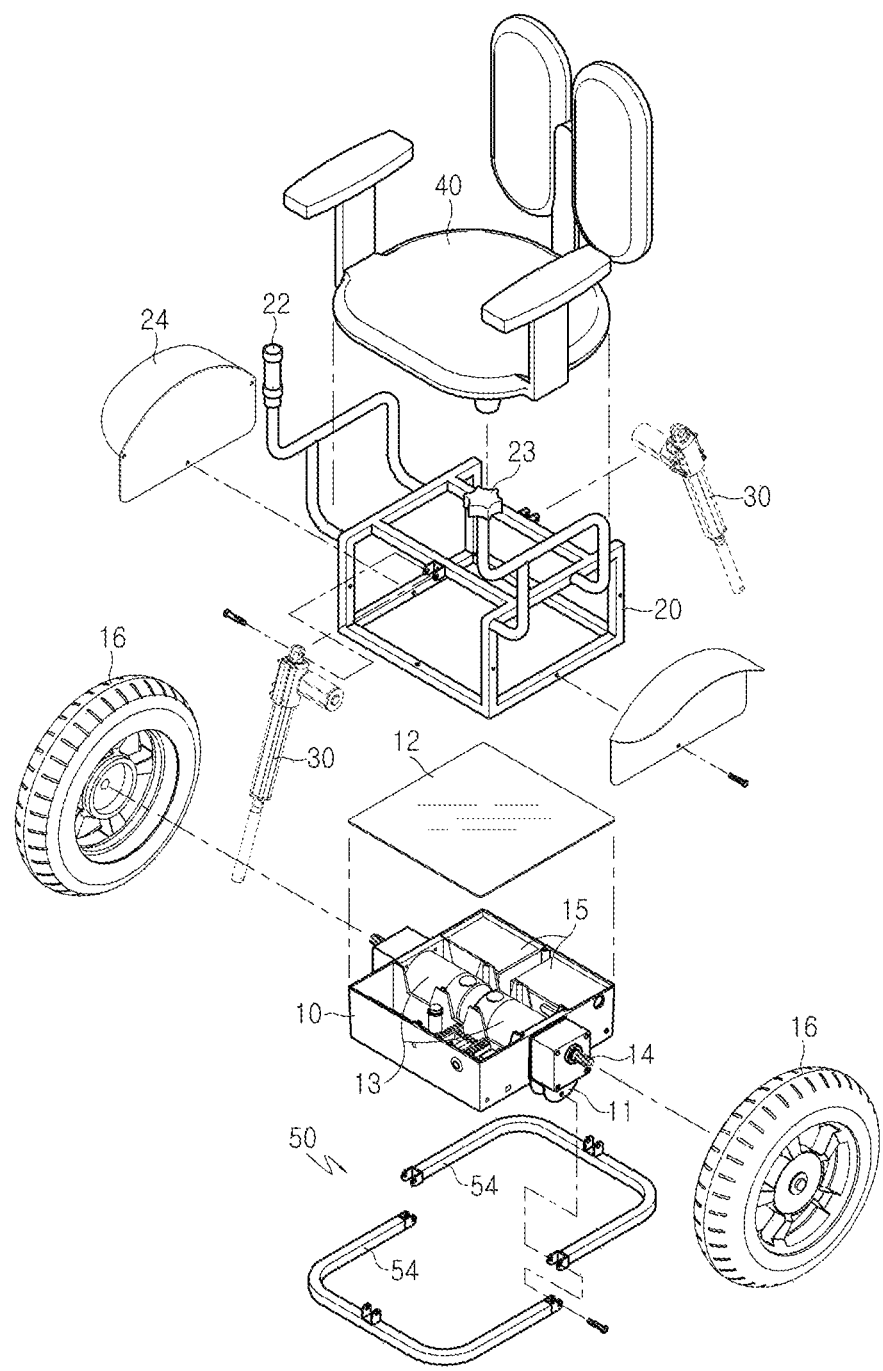
FIG. 2 is an exploded perspective view of a two-wheeled self-balancing wheelchair according to a preferred embodiment of the present invention.

FIG. 2 is an exploded perspective view of a two-wheeled self-balancing wheelchair according to a preferred embodiment of the present invention. As shown in FIG. 2, the two-wheeled self-balancing wheelchair includes a housing 10 disposed at the center. The housing 10 includes: a plurality of batteries 15 mounted therein to supply electric power; two motors 13 mounted at the center inside the housing 10 for driving wheels 16 by receiving the electric power from the batteries 15; and rotary shafts 14 of the motors 13 drawn out from the housing 10. The wheels 16 are mounted to the rotary shafts 14. Furthermore, a controller in which various sensors including a gyro sensor are converged is mounted inside the housing 10 to manage running and direction conversion of the two-wheeled self-balancing wheelchair.

Additionally, the two-wheeled self-balancing wheelchair includes a cover 12 which covers the upper side of the housing 10 and a saddle frame 20 mounted on the upper portion of the cover 12 for mounting a chair 40. The saddle frame 20 is manufactured in a way that a steel material or a plastic material is bent or welded or in a self-assembly type to firmly support the chair 40 on which a rider sits. Of course, its concrete form may be realized in various ways. In the meantime, the saddle frame 20 includes: a hand-grip part 22 formed in such a manner that the rider can grip it with the hand comfortably in a state where the rider sits on the chair 40; a dial type manipulator 23 mounted to control direction conversion of the wheelchair; and a wheel cover 24 mounted at the side of the saddle frame 20 to surround the upper parts of the wheels 16.

Figure 3:
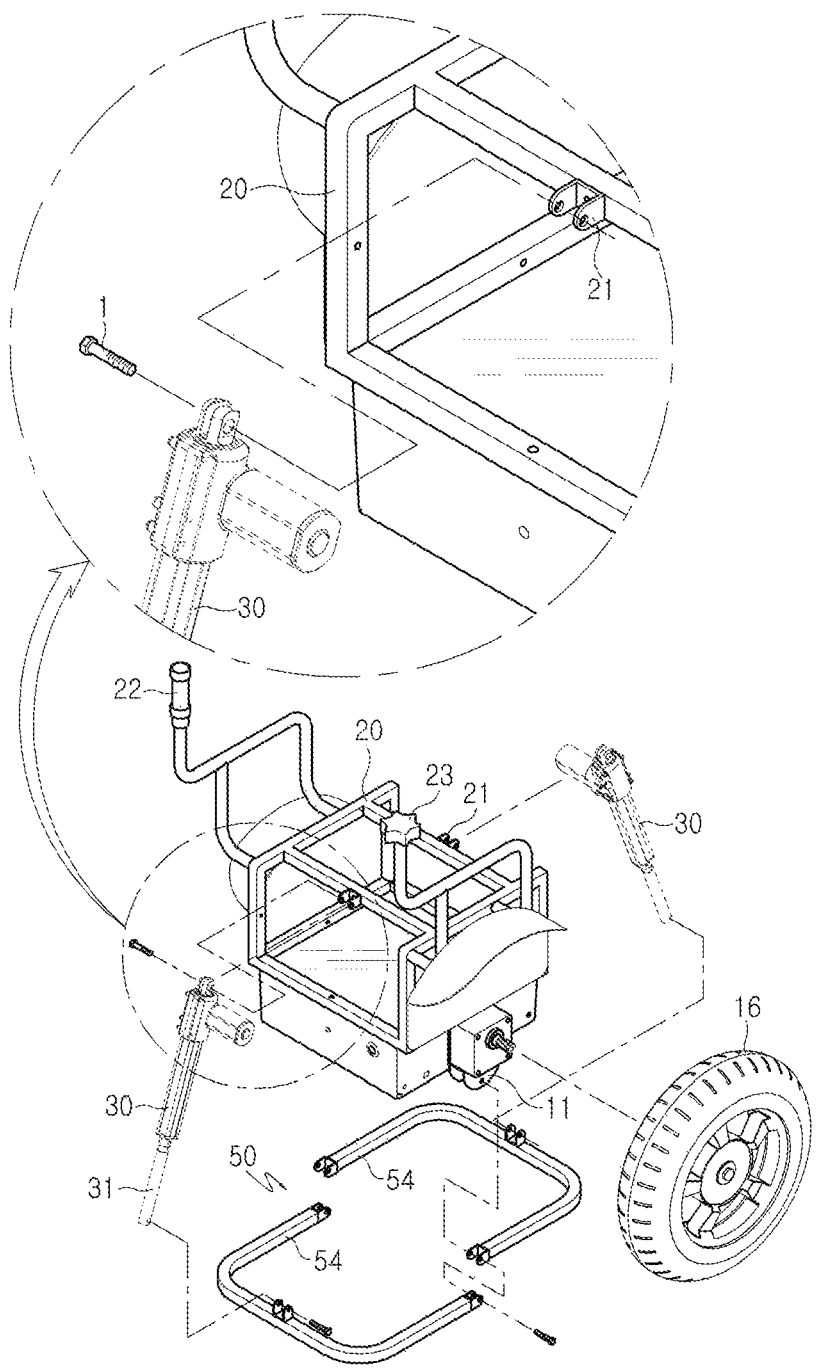
FIG. 3 is a perspective view for showing one side connection of a cylinder of the two-wheeled self-balancing wheelchair according to the preferred embodiment of the present invention.
Figure 4:
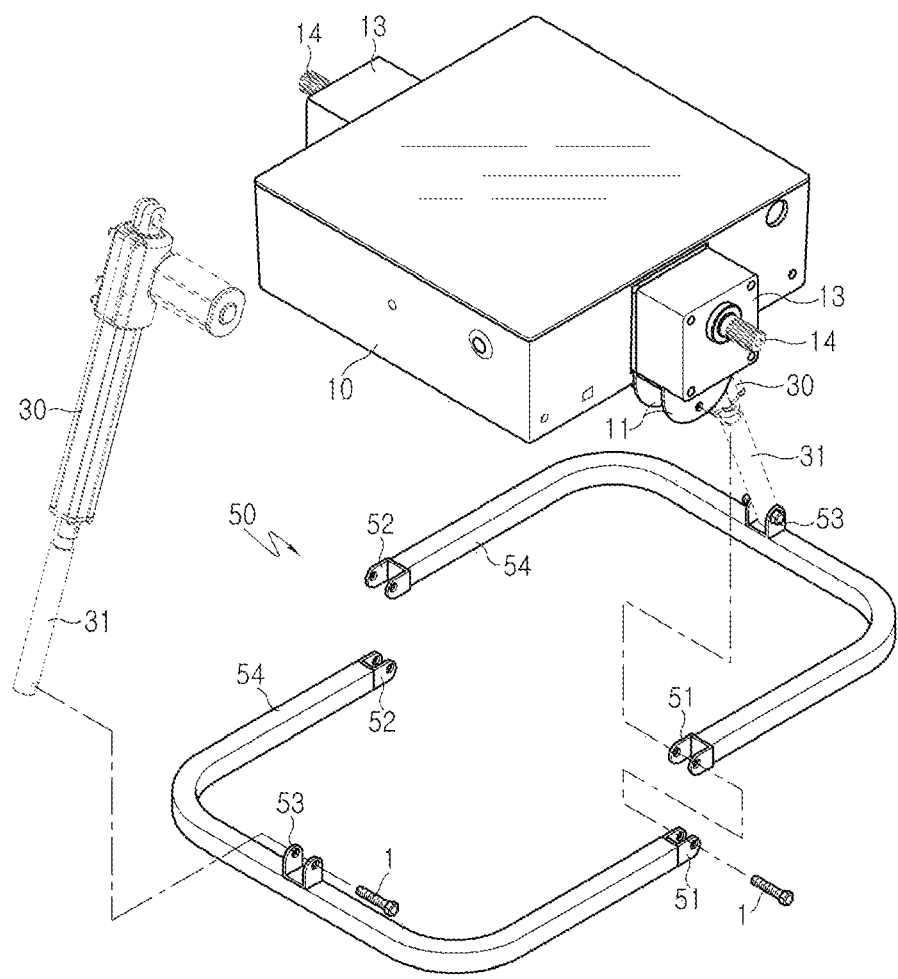
FIG. 4 is an exploded perspective view for showing a multipoint support of the two-wheeled self-balancing wheelchair according to the preferred embodiment of the present invention.

FIG. 3 is a perspective view for showing one side connection of a cylinder of the two-wheeled self-balancing wheelchair according to the preferred embodiment of the present invention, and FIG. 4 is an exploded perspective view for showing a multipoint support of the two-wheeled self-balancing wheelchair according to the preferred embodiment of the present invention. As shown in FIG. 3, two multipoint supports 50 which are operated in a hinge type are mounted at the bottom side of the housing 10, and in order to control a lifting motion of the multipoint supports 50, two cylinder 30 are mounted at cylinder brackets 21 formed at the front and the rear of the saddle frame 20. That is, as shown in the rounded enlarged view of FIG. 3, one side of the cylinder 30 is mounted to the cylinder bracket 21 of the saddle frame 20 by bolts 1, and as shown in FIG. 4, the other side of the cylinder 30 is mounted on a third hinge part 53 formed in the middle of a connection bar 54 of the multipoint support 50, such that the multipoint supports 50 can be smoothly lifted.

As shown in FIG. 4, the multipoint supports 50 are mounted at the bottom side of the housing 10 to prevent the wheelchair from falling down in the stopping or parking state that electric power is not supplied to the wheelchair. As shown in FIG. 4, support brackets 11 are mounted directly below the rotary shafts 14 of the motors 13 of the housing 10. A first hinge part 51 and a second hinge part 52 which are formed at the front end of the multipoint support 50 are mounted to be able to rotate by the bolts 1, and are connected with each other through the connection bar 54. As described above, the third hinge part is formed in the middle of the connection bar 54, which connects the first hinge part 51 and the second hinge part 52 with each other, so that a rod 31 of the cylinder 30 can be mounted.

Figure 5:
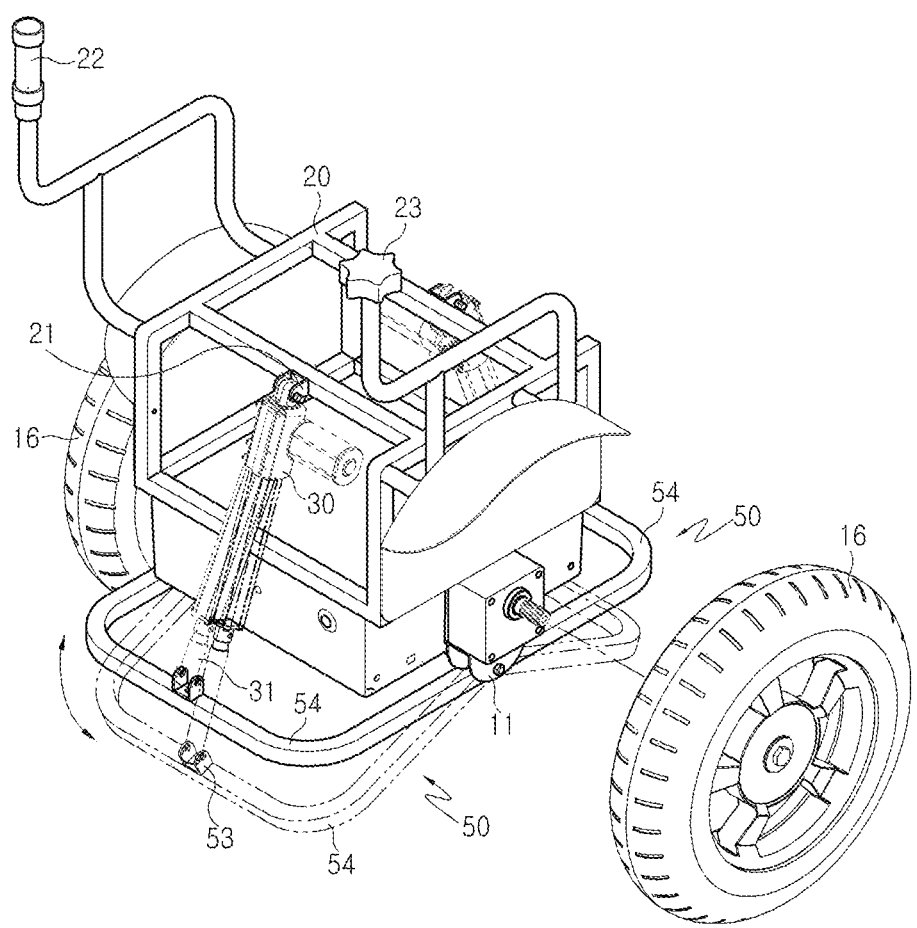
FIG. 5 is an assembled perspective view for showing the multipoint support of the two-wheeled self-balancing wheelchair according to the preferred embodiment of the present invention.
Figure 6:
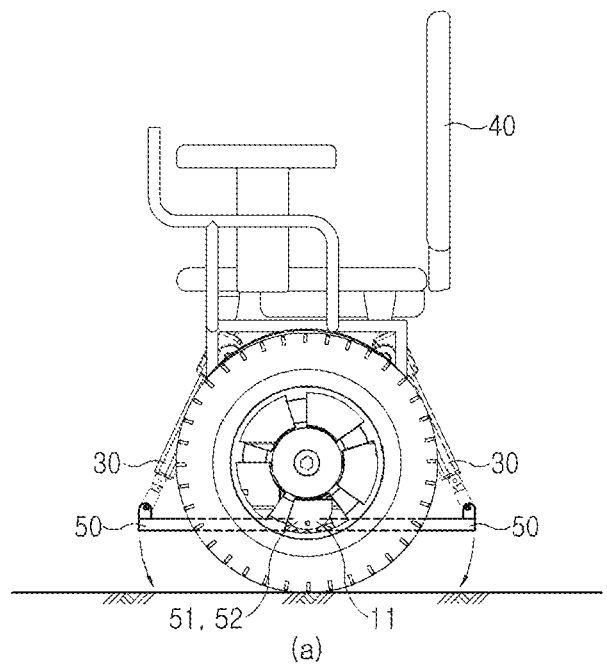
FIG. 6 is a side view for showing an operational principle of the multipoint support of the two-wheeled self-balancing wheelchair according to the preferred embodiment of the present invention.
Figure 6:
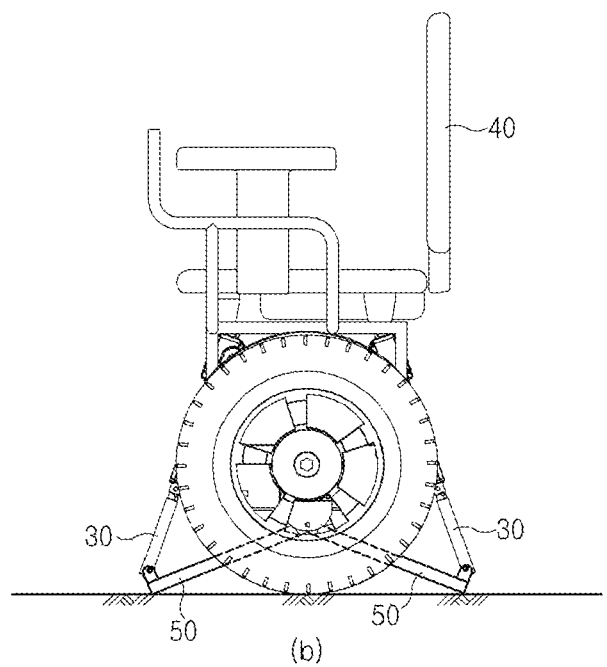

FIG. 5 is an assembled perspective view for showing the multipoint support of the two-wheeled self-balancing wheelchair according to the preferred embodiment of the present invention, and FIG. 6 is a side view for showing an operational principle of the multipoint support of the two-wheeled self-balancing wheelchair according to the preferred embodiment of the present invention. As shown in FIG. 5, when the cylinder 30 of which one side is mounted to the cylinder bracket 21 is operated, the rod 31 mounted at the third hinge part 53 formed in the middle of the connection bar 54 is drawn out, and as indicated by a two-dot chain line of FIG. 5, the multipoint supports 50 lower down.

In this instance, as shown in FIG. 6(a), the multipoint support 50 lowers while carrying out a circle motion around the first and second hinge parts 51 and 52 because the first hinge part 51 and the second hinge part 52 of the multipoint support 50 are mounted on the support bracket 11 to be able to rotate, and ascends in the same way. Therefore, when the multipoint support 50 lowers, as shown in FIG. 6(b), because the multipoint supports 50 touch the ground stably when the wheelchair stops or parks, the wheelchair does not fall down forward and backward.

Moreover, even though an external impact is locally concentrated on the connection bar 54 while the multipoint supports 50 are lifted by the cylinder 30 at the time that the wheelchair is moved, stopped or parked, because the first and second hinge parts 51 and 52 of the multipoint support 50 are respectively mounted to the support brackets 11 and the third hinge part 53 is mounted to the rod 31 of the cylinder 30 to disperse the load, the connection bar 54 is not bent or broken, and hence, the two-wheeled self-balancing wheelchair according to the present invention can protect the rider in safety.

In the meantime, in the drawings of the present invention, the multipoint support 50 is illustrated in the form of a "ㄷ" character, but if the multipoint support includes the first hinge part 51 and the second hinge part 52 joined with the bottom side of the housing 10 of the wheelchair, the connection bar 54 formed to connect the first and second hinge parts 51 and 52 and the third hinge part 53 connected with the cylinder 30 in the middle of the connection bar 54, the multipoint support 50 can provide the same effect without regard of shapes: a "C" shape, a "<" shape or whatever shape. Therefore, the present invention is not restricted to a specific shape of the multipoint support 50.

Figure 7:
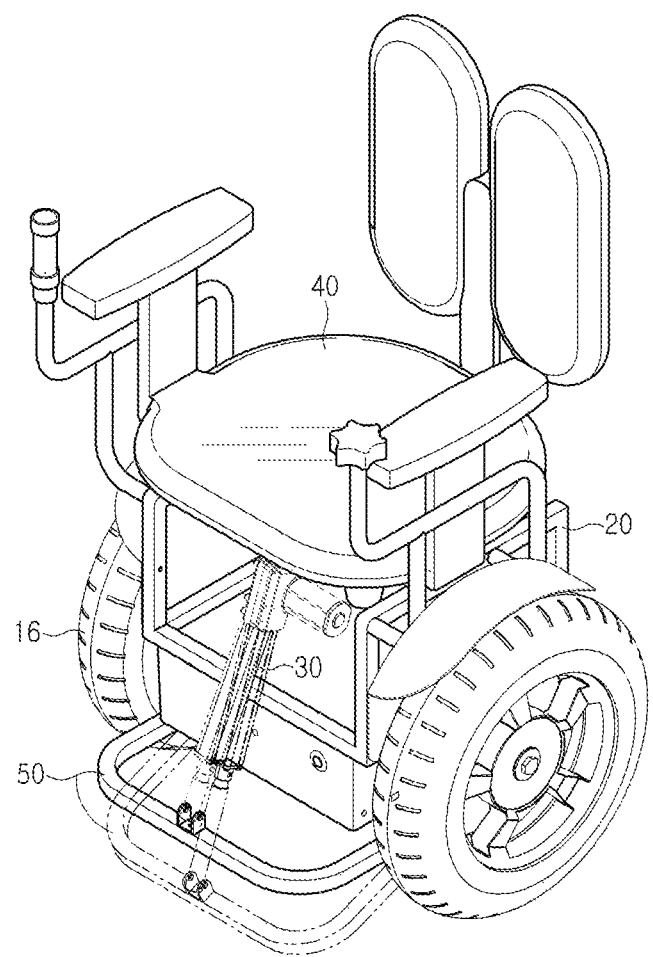
FIG. 7 is an assembled perspective view of the two-wheeled self-balancing wheelchair according to the preferred embodiment of the present invention.

FIG. 7 is an assembled perspective view of the two-wheeled self-balancing wheelchair according to the preferred embodiment of the present invention. The two-dot chain line in FIG. 7 indicates the multipoint support 50 in a state where the wheelchair is stopped or parked. In order to run, the rider manipulates the cylinder 30 to lift the multipoint support 50, and then, leans his or her body forward so that the wheelchair runs. In addition, the rider feels more convenient because the rider can put the feet on the multipoint support 50 lifted up. Moreover, the height of the lifted multipoint support 50 can be decided by the cylinder 30. Therefore, preferably, the rider lifts the multipoint support 50 to a small extent when the wheelchair runs indoors because the floor is flat, but lifts the multipoint support 50 to the maximum in order to prevent the multipoint support 50 from being caught to protruding parts of the road surface when the wheelchair runs outdoors because the floor is not even.

Furthermore, in consideration that wheelchairs are short-distance transportation means which the old or weak mainly use, the two-wheeled self-balancing wheelchair according to the present invention can prevent an overturn accident of the wheelchair by virtue of the multipoint support so as to run, stop and park more safely. Therefore, the two-wheeled self-balancing wheelchair according to the present invention can provide convenience to the old and weak or the disabled.

What is claimed is:

1. A two-wheeled self-balancing wheelchair comprising:
a housing (10) in which batteries (15), motors (13) and a controller having a gyro sensor are mounted, the housing (10) having support brackets (11) which are mounted directly below the rotary shafts (14) of the motors (13) located at both sides of the bottom side of the housing (10), rotary shafts (14) of the motors (13) which are drawn out from the housing (10), and wheels (16) which are mounted to the rotary shafts (14) and rotate in a way as to read an inclination angle of a rider's body;
a saddle frame (20) which is mounted on the upper part of the housing (10) and on which a chair (40) is mounted, the saddle frame (20) having cylinder brackets (21) formed at the front and rear of the saddle frame (20) in such a way that one side of a cylinder (30) is mounted; and multipoint supports (50) mounted at the front and rear of the support brackets (11), each of the multipoint supports (50) having a first hinge part (51) and a second hinge part (52) which are formed at the front ends of the multipoint support (50) to be able to rotate by bolts (1) and are connected with each other through a connection bar (54) and a third hinge part (53) which is formed in the middle of the connection bar (54) and to which a rod (31) of the cylinder (30) is mounted, such that the multipoint supports (50) are lifted while carrying out a circular motion around the first and second hinge parts (51, 52) mounted to the support brackets (11) by operation of the cylinder (30) to prevent overturn of the wheelchair.

* * * * *